(12) United States Patent
Lodolo

(10) Patent No.: US 10,274,098 B2
(45) Date of Patent: Apr. 30, 2019

(54) HYDRAULIC SERVO-ACTUATED VALVE HAVING A SIMPLIFIED ASSEMBLY

(71) Applicant: Alberto Lodolo, Genoa (IT)

(72) Inventor: Alberto Lodolo, Genoa (IT)

(*) Notice: Subject to any disclaimer, the term of this patent is extended or adjusted under 35 U.S.C. 154(b) by 16 days.

(21) Appl. No.: 15/312,905

(22) PCT Filed: May 26, 2015

(86) PCT No.: PCT/IB2015/053912
§ 371 (c)(1),
(2) Date: Nov. 21, 2016

(87) PCT Pub. No.: WO2015/181709
PCT Pub. Date: Dec. 3, 2015

(65) Prior Publication Data
US 2017/0108136 A1   Apr. 20, 2017

(30) Foreign Application Priority Data
May 28, 2014   (IT) .............................. MI2014A0974

(51) Int. Cl.
*F16K 31/00* (2006.01)
*F16K 27/02* (2006.01)
(Continued)

(52) U.S. Cl.
CPC .......... *F16K 27/0236* (2013.01); *F16K 7/126* (2013.01); *F16K 31/385* (2013.01)

(58) Field of Classification Search
CPC ........... F16K 31/385; F16K 7/12; F16K 27/02
(Continued)

(56) References Cited

U.S. PATENT DOCUMENTS 1,985,600 A * 12/1934 Collins ................. F04B 49/243
                                                      251/61
2,377,227 A *  5/1945 Griswold .............. F16K 31/385
                                                      137/489.5
(Continued)

FOREIGN PATENT DOCUMENTS

FR          2250059 A1    5/1975

OTHER PUBLICATIONS

International Search Report and Written Opinion for International Application No. PCT/IB2015/053912 (dated Oct. 28, 2015) (9 Pages).

(Continued)

*Primary Examiner* — Umashankar Venkatesan
(74) *Attorney, Agent, or Firm* — Lucas & Mercanti, LLP

(57) ABSTRACT

A hydraulic servo-actuated valve with a valve body having a first duct, a second duct, a main opening arranged on the valve body, an actuator arranged at the main opening and adapted to open and close the valve is provided. The valve has a lid arranged in an operative position on the valve body at the main opening, and the lid has a central zone concurring with the actuator to delimit an actuating chamber. The first duct has a first through-hole, and the lid has a second through-hole arranged in a position corresponding to the first through-hole, when the lid is arranged on the valve body in an operative position. The central zone of the lid also has a third through-hole. The lid has first connecting means adapted to allow a flanged and removable connection of a first operative member only to the lid, and the first connecting means is arranged near the second through-hole and the third through-hole.

13 Claims, 3 Drawing Sheets

(51) Int. Cl.
*F16K 31/385* (2006.01)
*F16K 7/12* (2006.01)

(58) Field of Classification Search
USPC .................................... 251/61, 61.1, 61.2
See application file for complete search history.

(56) References Cited

U.S. PATENT DOCUMENTS

| | | | | |
|---|---|---|---|---|
| 2,572,175 | A * | 10/1951 | McPherson | F16K 31/402 |
| | | | | 251/30.05 |
| 3,180,355 | A * | 4/1965 | Long | F16K 17/105 |
| | | | | 137/454.5 |
| 3,591,126 | A * | 7/1971 | Hauser | F16K 31/402 |
| | | | | 251/30.02 |
| 4,181,151 | A * | 1/1980 | Ensign | F16K 7/17 |
| | | | | 137/625.28 |
| 5,632,465 | A | 5/1997 | Cordua | |
| 7,124,774 | B2 * | 10/2006 | Weingarten | F16K 31/1266 |
| | | | | 137/514.7 |
| 7,552,906 | B2 * | 6/2009 | Irwin | F16K 7/126 |
| | | | | 251/331 |
| 9,097,360 | B2 * | 8/2015 | Mesner | F25B 41/06 |
| 2012/0080567 | A1 | 4/2012 | Hagihara | |
| 2014/0077108 | A1 * | 3/2014 | Ringer | F16K 7/126 |
| | | | | 251/61.1 |

OTHER PUBLICATIONS

Italian Search Report for Italian Patent Application No. MI20140974 (dated Feb. 6, 2015) (2 Pages).

* cited by examiner

HYDRAULIC SERVO-ACTUATED VALVE HAVING A SIMPLIFIED ASSEMBLY

CROSS-REFERENCE TO RELATED APPLICATIONS

This application is a 371 of PCT/IB2015/053912 filed May 26, 2015, which claims the benefit of Italian Patent Application No. MI2014A000974 filed May 28, 2014.

FIELD OF THE INVENTION

The present invention relates to a hydraulic servo-actuated valve, according to the preamble of the main claim.

KNOWN PREVIOUS ART

Hydraulic servo-actuated valves are often used in agriculture and are passed through by water that can be dirty and carry small pieces of wood, soil or pebbles.

The hydraulic servo-actuated valves comprise a valve body with an inlet duct and an outlet duct, that meet along a sealing edge above which the valve body has a main opening. At such an opening an actuator is arranged, usually a deformable membrane made of rubbery material, whose edge is tightened between the edge of the main opening and the edge of a lid joined to the valve body by a flanged connection. The lid and the deformable membrane define an actuating chamber adapted to receive the liquid from the inlet duct through a first operative member. When the valve is open the actuating chamber contains no pressurized liquid, the deformable membrane is lifted and the liquid flows out from the inlet duct to the outlet duct. In order to close the valve, the first operative member connects the inlet duct to the actuating chamber. The liquid entering the actuating chamber from the inlet duct generates a pressure in the actuating chamber that thrusts the deformable membrane to a completely lowered position, leading it to press against the sealing edge, so that to close the passage between the inlet duct and the outlet duct. Water pressure in the actuating chamber can overcome the water pressure in the valve body since the deformable membrane has an idle shape corresponding to the closed position of the valve. The force created by the plastic deformation of the deformable membrane is added therefore to the water pressure in the actuating chamber. The liquid in the actuating chamber can then flow out by a second operative member in the outlet duct or outwards. By reducing the pressure in the actuating chamber, the thrust on the deformable membrane by the liquid in the inlet duct causes the deformable membrane to lift from the sealing edge, thereby opening the valve.

Normally the inlet duct and the outlet duct both have a side through-hole. In the central zone the lid has two more through-holes for connecting to the actuating chamber. The first operative member is connected to the inlet duct and the actuating chamber, whereas the second operative member is connected to the actuating chamber and the outlet duct or to the outside.

The valve can also comprise only one operative member, e.g. a three-way valve, and the lid can have only one through-hole. In this case the same operative member connected to the inlet duct, the actuating chamber and the outlet duct or the outside, controls the filling and emptying of the actuating chamber.

The connections among operative members, the valve body and the lid are normally made by pipes.

A problem with such valves is that when the lid has to be opened, the pipes connecting to the side holes in the inlet and outlet ducts have to be disconnected beforehand, or else the two operative members have to be at least partially disassembled.

In WO2008034463 such a problem has been solved by positioning the holes on the inlet duct and on the outlet duct at a proper flange made on the valve body for the lid assembly. The lid has in turn two corresponding through-holes on the flange, for the connection to the inlet duct and the outlet duct, and two through-holes in the central portion that communicate with the actuating chamber. The first and the second operative member can be therefore connected to the actuating chamber and to the inlet and outlet ducts by metal pipes, which are all connected to the lid. This allows the lid to be disassembled and the valve to be opened, e.g. in order to replace the deformable membrane, without the need of disconnecting the operative members from the lid itself. Normally metal pipes are used rather than plastic or rubber pipes, since the latter could be easily damaged for example by a rodent.

A problem with such a valve is however that the assembly of operative members connecting the inlet duct and the outlet duct to the actuating chamber is quite labor-intensive and requires a lot of time.

One more problem is that the general structure is rather weak with respect to external stresses and the valve can be damaged, for example the pipes can be easily bent or crushed if an adequate weight is rested on the valve, for example if a worker accidentally goes up the valve with his own weight.

Curved pipes connecting control operative members to the valve can also clog up due to the dirt circulating in the duct.

Besides, if a pipe leading water to the actuating chamber breaks, the valve opens, it can not even be manually closed and this can cause significant damages to people and things, in addition to a large waste of water.

One more problem is that the deformable membrane during the closing step bears on the sealing edge, which separates the inlet duct from the outlet duct. Pressure acting on the deformable membrane when the valve is closed, due to water in the first duct, can cause small displacements or make the deformable membrane slip on the sealing edge, which in the long run gets worn thereby impairing the good sealing of the valve when it is closed.

While the deformable membrane can be easily replaced, a too stringent wear of the sealing edge requires the replacement of the valve body.

Object of the present invention is therefore implementing a hydraulic servo-actuated valve that allows overcoming the mentioned drawbacks, in particular an object is to implement a servo-actuated valve allowing easier and faster assembling of the valve and the operative members thereof.

Another object is to implement a hydraulic servo-actuated valve that is more robust in regard to both external actions and possible clogging due to dirt.

A further object is to implement a hydraulic servo-actuated valve that can have longer life with regard to the wear and that can operate for long also in relatively dirty water, typically used for irrigation.

SUMMARY OF THE INVENTION

Said objects are obtained by a hydraulic servo-actuated valve whose inventive features are highlighted by the claims.

BRIEF DESCRIPTION OF THE DRAWINGS

The invention will be better understood by the following specification, provided for illustration purposes only, thus without limitation, of a preferred embodiment illustrated in the accompanying drawings in which.

DETAILED DESCRIPTION OF A PREFERRED EMBODIMENT OF THE INVENTION

Figure 1:
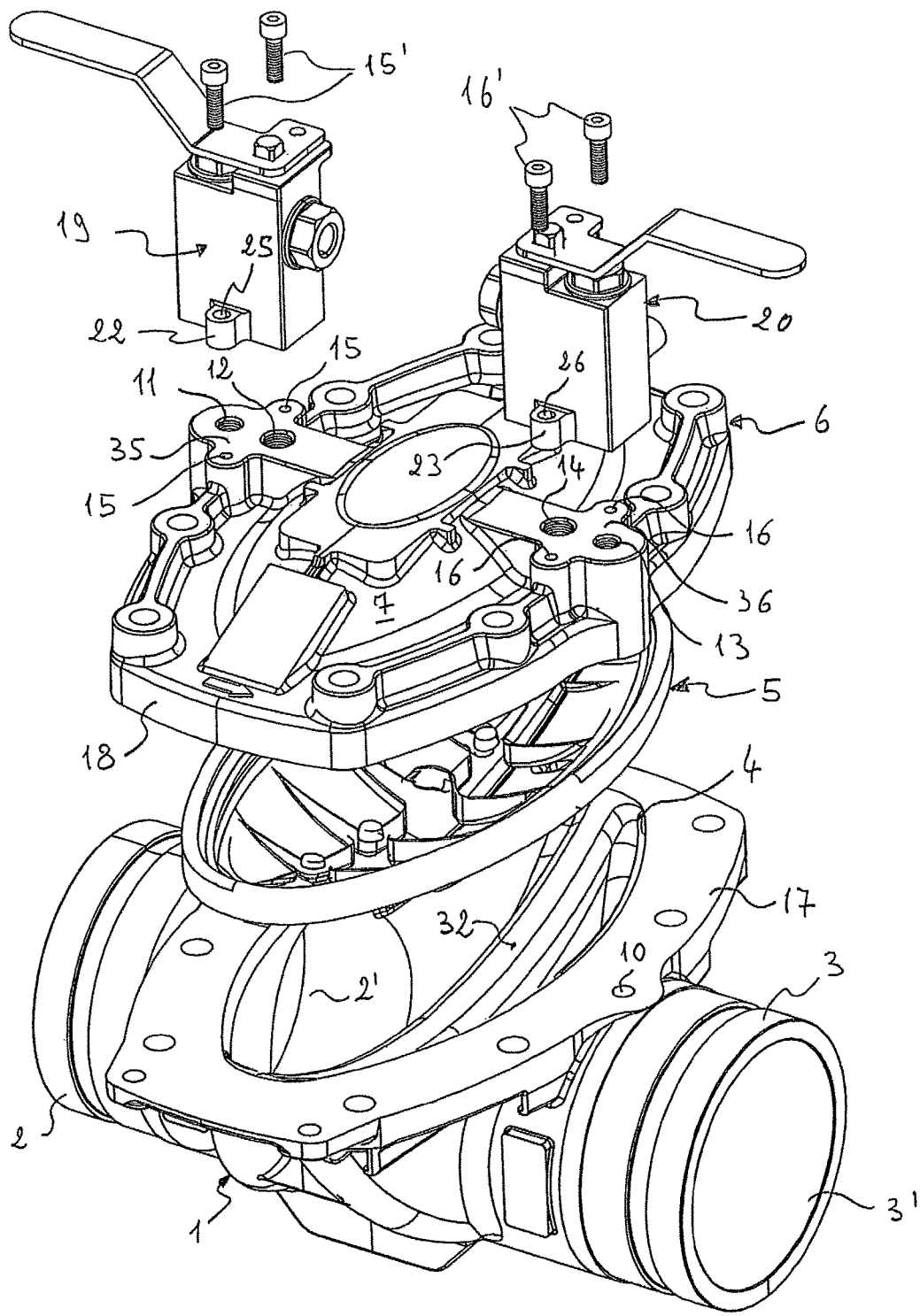
FIG. 1 shows a perspective exploded view of the hydraulic servo-actuated valve according to the invention and two operative members.

Referring to the figures, it can be seen that the hydraulic servo-actuated valve according to the invention comprises a valve body 1 comprising a first duct 2 with a first opening 2' and a second duct 3 with a second opening 3'. Said first duct 2 and second duct 3 meet along a sealing edge 32.

The valve body further has a main opening 4 arranged between the first duct 1 and the second duct 2 at the sealing edge 32. The valve comprises an actuator 5, in the example a deformable membrane of rubbery material, arranged in an operative position at the main opening 4, so that to completely close it. The actuator 5 could also comprise a movable piston.

The valve body 1 has a first flange 17 arranged around the main opening 4. The edge of the deformable membrane 5 rests in a seat obtained in such a first flange 17. The valve further comprises a lid 6 having a second flange 18 adapted to couple to the first flange 17. The lid 6 is arranged in an operative position on the valve body 1 at the main opening 4, so that the edge of the deformable membrane 5 is tightened between the first flange 17 and the second flange 18.

The lid 6 has a rounded central zone 7, which does not rest on the valve body 1 and concurs, with the deformable membrane 5, in delimiting an actuating chamber 8.

The first duct 2 has a first through-hole 9 at the first flange 17.

The lid 6 has a second through-hole 11 on the second flange 18 and a third through-hole 12 arranged on the central zone 7.

The second duct 3 has a fourth through-hole 10 at the first flange 17.

The lid 6 further has a fifth through-hole 13 arranged on the second flange 18 and a sixth through-hole 14 arranged on the central zone 7.

The second and the fifth through-hole 11 and 13 are arranged on the second flange 18 in positions corresponding to the first and the fourth through-hole 9 and 10 respectively, when the lid 6 is arranged on the valve body 1 in an operative position, over the main opening 4, the second flange 18 overlapping the first flange 17.

For a better seal between the first and the second hole 9 and 11 and between the fourth and the fifth hole 10 and 13, the valve comprises a first annular gasket 27 and a second annular gasket 28 which are arranged between the first flange 17 of the valve body 1 and the second flange 18 of the lid 6, the first annular gasket 27 at the first and second through-hole 9, 11 and the second annular gasket 28 at the fourth and fifth through-hole 10, 13.

The deformable membrane 5 is adapted to be deformed by carrying out an actuation movement between a lifted opening position, which allows a liquid flow between the first duct 2 and the second duct 3, and a lowered closed position, in which the deformable membrane 5 rests on the sealing edge 32 thereby preventing the flow between the first duct 2 and the second duct 3. In the servo-actuated valve, the closing movement is produced by the liquid drawn from the upstream duct, for example the first duct 2, and introduced into the actuating chamber 8.

A first operative member 19 is directly connected to the lid 6 and connected to the second hole 11 and the third hole 12. A second operative member 20 is directly connected to the lid 6 and connected to the fifth hole 13 and the sixth hole 14. By considering the slip way of the fluid inside the valve, the first operative member 19 is then arranged upstream and the second operative member is arranged downstream. The first and the second operative member 19 and 20 can both comprise for example a two- or three-way solenoid pilot electrovalve, a two- or three-way pressure-reducer pilot, a quick-relief pilot, a two- or three-way pressure-sustaining pilot, a manual double- or triple-throw switch, a hydraulic amplifying relay. Such operative members are needed to connect the actuating chamber to the first duct or to the second duct or outward.

The first and the second operative members 19 and 20 are flanged, i.e. each one comprises a small flange, termed small flange 22 and 23, with connecting through-holes 25, 26, adapted to allow a direct connection to the lid by means of first and second releasable connecting means 15 and 16 and respective first and second connecting counter-means 15' and 16'.

As in the depicted example, the small flange 22, 23 can consist of two lobes or even of only one member adapted for a removable direct-overlapping connection and can also be arranged in the center of the first or second operative member.

The first and second connecting means comprise threaded blind holes termed fastening holes 15 and 16 arranged on the lid 6 near the second and the third through-hole 11 and 12 and the fifth and the sixth through-hole 13 and 14. The respective connecting counter-means 15' and 16' comprise screws adapted to pass through the connecting holes 25, 26 of the small flange and to engage in the fastening holes 15 and 16, thereby tightening the small flange 22, 23 of the operative member to the lid 6.

Said first and second connecting means are therefore adapted to allow a flanged and removable connection to only the lid 6 of a first and a second operative member 19 and 20. Said connecting means and counter-means can also comprise pins or rivets. In the flanged connection the operative member is directly overlapped to the lid without a mutual rotation, with the possible interposition of one or more sealing gaskets. The lack of a mutual rotation in the flanged connection ensures the accurate positioning of the operative member on the lid at the through-holes. The flange of the operative member is overlapped to the lid surface and connected thereto by releasable connecting means and respective counter-means, such as screws or bolts adapted to engage in threaded holes arranged on the lid. Naturally only one from lid and operative member is necessarily provided with a flange for the mutual connection.

In the exemplary embodiment represented in the figures, the lid has a first flat bearing surface 35 on which the second and the third through-hole 11 and 12 are arranged and a second flat bearing surface 36 on which the fifth and the sixth through-hole 13 and 14 are arranged. Such bearing surfaces are adapted to receive a corresponding bearing surface of the operative member. The first threaded and blind fastening holes 15 are arranged on the first bearing surface 35 and the second threaded and blind fastening holes 16 are arranged on the second bearing surface 36, for the removable and flanged connection to the first and the second operative member 19 and 20, respectively.

The first and second connecting means 15 and 16 can actually comprise threaded pins rather than threaded fastening holes, to be inserted into the connecting holes 25, 26 of the small flange 22, 23 in order to make a tightening with threaded nuts.

At the edge of the first and the second bearing surface 35 and 36, the lid 6 can also have a flange for coupling the operative members to the small flange, the releasable connecting means being able to comprise bolts or even jaws adapted to tighten the two coupled flanges.

In its operative configuration the valve comprises a first operative member 19 removably connected to the second and the third through hole 11 and 12, and a second operative member 20 removably connected to the fifth and the sixth through-hole 13, 14. The two connections take place by the corresponding small flanges 22 and 23 the operative members 19 and 20 are provided with, without intermediate pipes, but with the interposition only of an annular gasket at the through-holes between lid 6 and the first or the second operative member. Such connections among the operative members and the lid are therefore direct-overlapping or flanged connections.

By means of the first operative member 19 the connection between the actuating chamber 8 and the first duct 2 or else the outside, can be controlled. By means of the second operative member 20 the connection between the actuating chamber 8 and the second duct 3 or the outside, can be controlled.

Figure 2:
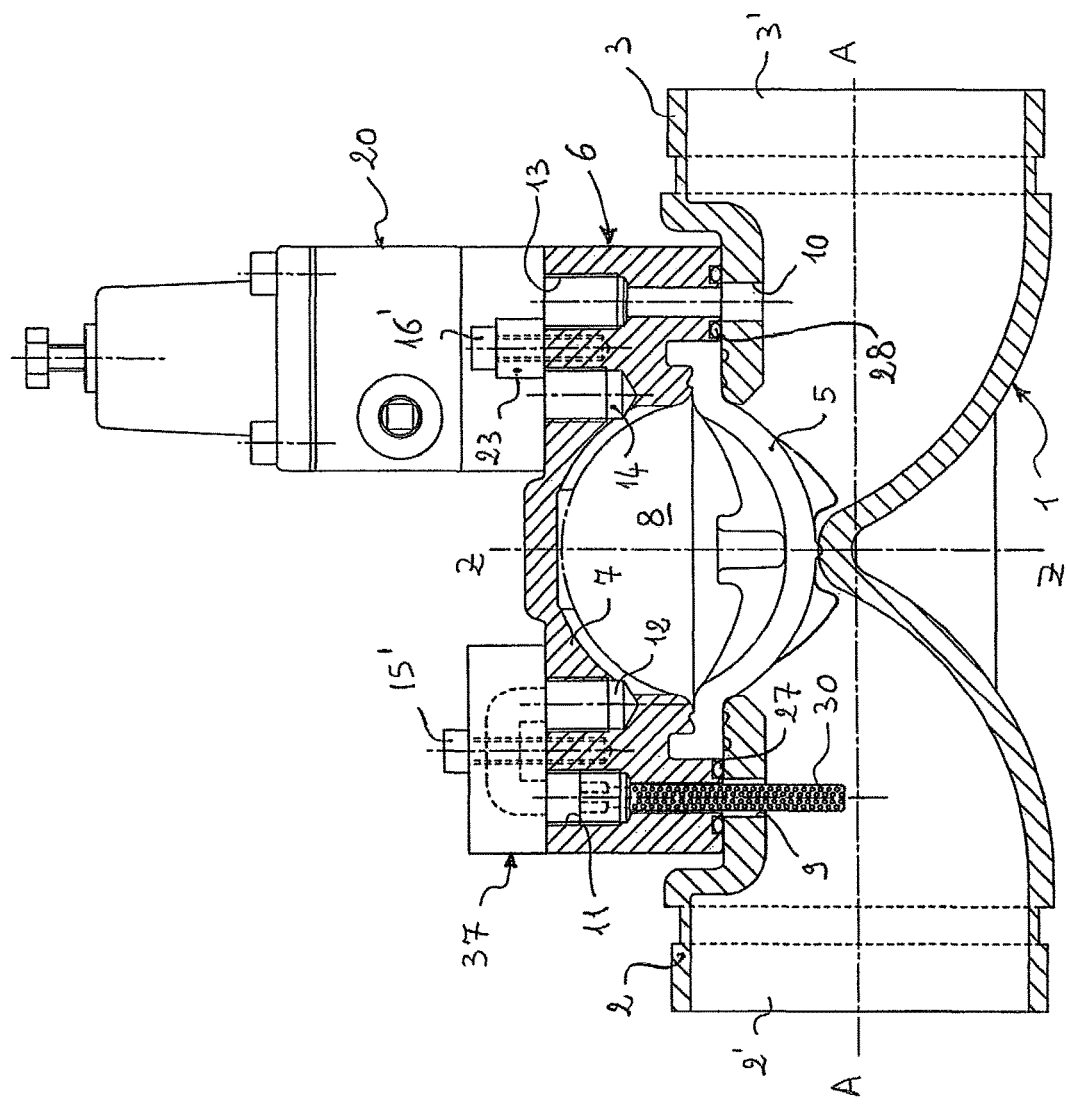
FIG. 2 shows a longitudinal section of the valve according to the invention with two operative members, of which one is a splined block.

It is also possible that only one operative member on two through-holes is connected to the valve and that the other two through-holes of the lid are reciprocally connected by a splined block 37, as represented in FIG. 2. Such a splined block 37 has an inner channel and is adapted to directly link the second and the third through-hole 11 and 12 or the fifth and the sixth through-hole 13 and 14. Such a splined block 37 preferably has connecting holes for the removable connection to the fastening holes 15 by means of screws, in the same way as the connection of an operative member. The splined block can be considered itself an operative member, although very simple in nature. The connection of two through-holes by means of a splined block 37 allows keeping the robustness of the valve on the whole and the easiness and fastness of the assembly. The different operative members, that can connect the actuating chamber to the first duct 2 and the second duct 3 or to the outside, control the actuating movement of the deformable membrane 5 between the opening position and the closed position, as a function of different input signals, such as for example the downstream pressure, the upstream pressure or a command given by an operator. The operative members can also provide a manually-operated command.

In the exemplary embodiment represented in the figures the valve body 1, the lid 6 and the deformable membrane 5 are symmetrical with respect to a symmetry plane S normal to a main slip axis A-A of the liquid in its inside, said main slip axis A-A being identified as the axis linking the central point of the first opening 2' and the central point of the second opening 3'.

Such a symmetry plane S passes through the sealing edge 32. Such symmetry allows assembling the valve body 1 in two different ways: with the first duct placed upstream and the second duct placed downstream or vice versa, by rotating the valve body 1 by 180° around a normal axis Z-Z lying on the symmetry plane S and normal to the main slip axis A-A. Once the valve body is rotated by 180°, the lid with the operative members connected thereto can remain in the original position, holding the first operative member 19 upstream and the second operative member 20 downstream.

Due to the symmetry of the valve body, the lid and the membrane, the whole valve can be rotated by 180° around the normal axis Z-Z, or only the valve body 1 or else only the lid 6 can be rotated.

If the valve, whilst not being symmetrical, can operate correctly when the liquid passes through it in a way or in the opposite way, of course by connecting the suitable operative members 19 and 20 upstream and downstream, the valve is termed reversible.

Whereas the symmetry, with respect to the symmetry plane, is a sufficient condition for the overall reversibility of the valve and, separately, of components thereof as the valve body 1, the lid 6 and the deformable membrane 5, such symmetry is not a necessary condition.

Rotating the valve body by 180° around the normal axis Z-Z allows still having a good seal and extending the valve life although the sealing edge is worn on a side.

In the exemplary embodiment represented in the figures, the mutual positions of the second through-hole 11, the third through hole 12 and the first connecting means 15 are equal to the mutual positions of the fifth through-hole 13, the sixth through-hole 14 and the second connecting means 16. This configuration makes the lid 6 reversible and allows connecting indifferently an operative member in place of another depending on their operation on the valve. The assembly is therefore easier and faster. There could be the case of a reversible valve body 1 and a not reversible lid, said lid comprising for example the second and the third through-hole 11 and 12, but not the fifth and the sixth through hole 13 and 14. There could also be a lid in which the fifth and the sixth through-hole are mutually connected by a channel inside the lid itself, as if there is a splined block made in a single piece.

Figure 3:
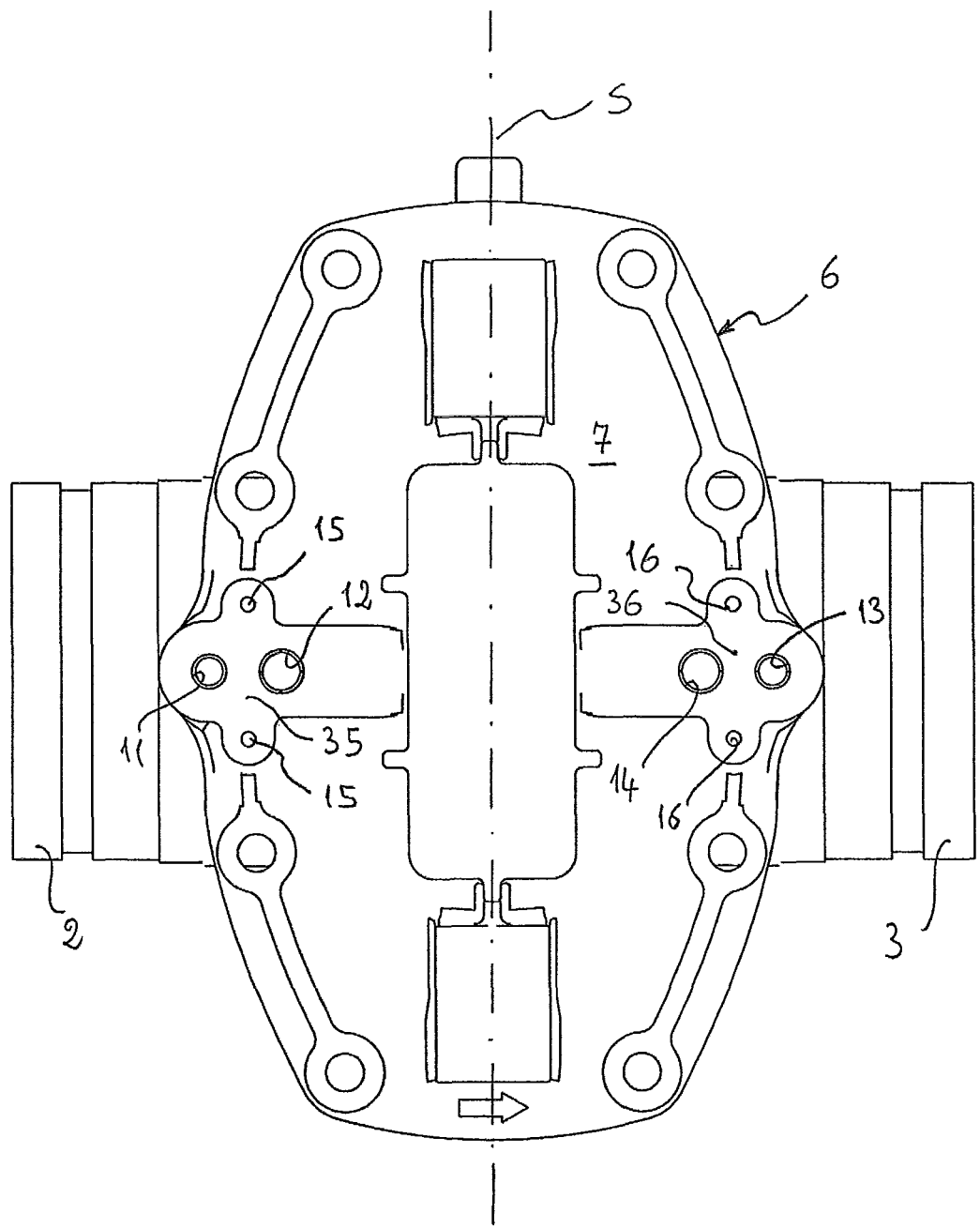
FIG. 3 shows a view of the lid and the valve body without operative members.

The lid, still being reversible, can have an arrow, as the one visible in FIG. 1 and in FIG. 3, since the valve is often purchased with the operative members already assembled, and such operative members determine the direction of the flow inside the valve. In this way the worker that has to assemble the valve immediately knows which is the inlet duct, that has to be placed upstream, and which is the outlet duct, that has to be placed downstream.

Since the valve operates on irrigation water, which can therefore be dirt with soil or other, in order to avoid clogging of the operative members connected to the through-holes of the duct, a tubular filter or cigarette filter 30 is arranged upstream at the second hole 11 or the fifth hole 13. In order to preserve the reversibility, although the filter is arranged only upstream, both the second and the fifth through-hole 11 and 13 have a stop adapted to support the filter which can be removed and replaced without disconnecting the lid 6 from the valve body 1.

In general, the operative member is made by the valve manufacturer whereby it comprises a small flange. It is however possible that the valve user purchases a commercially available operative member lacking in a compatible linkage to the flanged connection, which is provided by the valve lid according to the invention. For greater versatility, therefore, the through-holes on the lid (second, third, fifth and sixth through-hole, 11, 12, 13 and 14) have an inner thread to allow also a conventional linkage to the operative members by means of pipes. The first connecting means 15 arranged near the second 11 and the third 12 through-hole and the second connecting means 16 arranged near the fifth 13 and the sixth 14 through-hole obviously differ from the thread possibly realized, for a greater assembling versatility, directly inside the second, third, fifth and sixth through-hole 11, 12, 13, and 14.

The small flange of the operative member could have only two lobes and such lobes could be oriented so that to not be coplanar, otherwise it could have no connecting holes and being tightened to the lid only by the head of the screw engaging in the threaded fastening hole 15.

The first connecting means could be composed of a single threaded and blind fastening hole arranged between the second and the third through-hole of the lid 6, as well as the second connecting means could be composed of a single threaded and blind fastening hole arranged between the fifth and the sixth through hole.

In its operation, when the first operative member 19 arranged upstream connects the first duct 2 to the actuating chamber 8, the water coming from the first duct floods the actuating chamber 8, thereby thrusting the deformable membrane 5 to a lowered position until it rests on the sealing edge 32 and closes the valve.

When the second operative member 20 arranged downstream connects the actuating chamber 8 to the second duct 3 or to the outside, the water flows out of the actuating chamber and the pressure applied on the deformable membrane by water being in the first duct 2 causes the membrane to lift and the valve to open.

The valve may be controlled by only one operative member.

When the first duct 2 is arranged upstream thereby realizing an inlet duct and the second duct 3 is arranged downstream thereby realizing an outlet duct, the different operative members can perform the following functions:

a three-way solenoid pilot electrovalve, connected to the second and the third through-hole, allows connecting the first duct 2 to the actuating chamber 8, in this way controlling the valve closing, and the actuating chamber 8 to the outside, in this way controlling the valve opening;
  a two-ways solenoid pilot electrovalve. or a two-way pressure reducer pilot connected to the fifth and the sixth through-hole, allows connecting the actuating chamber 8 to the second duct 3, in this way controlling the valve opening;
  a three-way pressure-reducer pilot, connected to the second and the third through-hole and to the outside and additionally through a pipe to the fifth through-hole so that to detect the downstream pressure, allows connecting the actuating chamber 8 to the first duct 2 and the outside, thereby controlling the valve opening and closing as a function of the downstream pressure;
  a two-way quick-relief pilot, connected to the second and the third through-hole, allows rapidly opening and closing the valve as a function of the upstream pressure;
  a two-way pressure-sustaining pilot, connected to the fifth and the sixth through-hole and through a pipe to the second through-hole, to detect the upstream pressure, allows connecting the actuating chamber 8 to the second duct 3, by controlling the valve opening and closing as a function of the upstream function, its operation being similar to that one performed by the quick-relief pilot, but being slower;
  a three-way pressure-sustaining pilot connected to the second and the third through-hole and the outside, allows connecting the actuating chamber 8 to the first duct 2 and the outside, controlling the valve opening and closing as a function of the upstream pressure;
  a manual double- or triple-throw switch is connected and acts similarly to the two- or three-way pilot electrovalve, but is manually controlled;
  a hydraulic amplifying relay acts as one of the operative members described above, but is controlled by a pressure signal that can come from far away, rather than by an electrical signal.

Other operative members can be applied to the valve in order to control the opening and closing thereof.

There could also be a single operative member aggregating the functions of two operative members.

Due to the first and second connecting means allowing a direct and removable connection of flanged operative members to the lid, an easier and faster assembly results, thereby removing in almost any case the joint pipes. In this way the valve on the whole is more robust, free from pipes that can break, bend, crush and clog up.

Due to the operative members being connected to the lid only, the opening of the lid, for example for replacing the deformable membrane, does not require the disconnection of the operative members, thus resulting easier and faster.

An advantageous characteristic of the invention is that the valve body 1 is reversible, being able to be rotated by 180° with respect to the normal axis Z-Z, in this way increasing the useful life of the valve.

The fact that the valve body is reversible with respect to the lid allows rotating the valve body only, holding the lid and the operative members connected thereto in the original position.

Being the assembly of valve body 1, lid 6 and deformable membrane 5 reversible allows a greater assembling easiness and fastness thereby reducing the possibility of mistakes.

The operative members also comprising a splined block 37, which is applied to the lid by means of a small flange and is adapted to directly connect two through-holes of the lid, makes the lid more versatile and the valve more robust.

The invention claimed is:

1. A hydraulic servo-actuated valve comprising:
   a valve body comprising a first duct, with a first opening, a second duct, with a second opening, a main opening, arranged on the valve body between the first duct and the second duct, an actuator arranged at the main opening and adapted to make an actuating movement between an opening position, which allows the flow between the first duct and the second duct, and a closed position preventing the flow between the first duct and the second duct,
   said valve comprising a lid, arranged in an operative position on the valve body at the main opening, said lid having a central zone concurring with the actuator to delimit an actuating chamber, the first duct having a first through-hole, the lid having a second through-hole arranged in a position corresponding to the first through-hole, when the lid is arranged on the valve body in an operative position, the central zone of the lid having a third through-hole,
   wherein said lid comprises at least a first fastening hole arranged on the lid, or at least a first pin or at least a flange adapted to allow a flanged and removable connection of a first operative member only to the lid, and to the second through-hole and to the third through-hole;

wherein said second duct having a fourth through-hole and the lid having a fifth through-hole arranged in a position corresponding to the fourth through-hole, when the lid is arranged on the valve body in an operative position, the central zone of the lid having a sixth through-hole, said lid comprising at least a second fastening hole arranged on the lid or at least a second pin or at least a flange adapted to allow a flanged and removable connection of a second operative member only to the lid, to the fifth through-hole and to the sixth through-hole, and wherein said valve body is reversible so that said body valve can be assembled in such a way to operate correctly with the liquid passing through said body valve in a first way or in an opposite, second way.

2. The hydraulic valve according to claim 1, wherein said first fastening hole is a threaded and blind hole.

3. The hydraulic valve according to claim 1, wherein said first or second pin comprises a threaded pin.

4. The hydraulic valve according to claim 1, wherein the mutual positions of the second through-hole, the third through hole and said first fastening hole or said first pin correspond to the mutual positions of the fifth through-hole, the sixth through-hole and said second fastening hole or said second pin.

5. The hydraulic valve according to claim 1, wherein the lid has a first flat bearing surface, on which the second and the third through-hole are arranged and a second flat bearing surface, on which the fifth and the sixth through-hole are arranged, first threaded and blind fastening holes being arranged on the first bearing surface and second threaded and blind fastening holes being arranged on the second bearing surface, for the removable connection to the first and second operative member respectively.

6. The hydraulic valve according to claim 1, wherein the hydraulic valve is symmetrical with respect to a plane S normal to a main slip axis A-A of the liquid, said main slip axis A-A being identified as the axis linking the central point of the first opening and the central point of the second opening.

7. The hydraulic valve according to claim 1 wherein said actuator comprises a deformable membrane that is interposed between the valve body and the lid.

8. The hydraulic valve according to claim 1, wherein the valve body has a first flange arranged around the main opening and the lid has a second flange adapted to be coupled to the first flange, the first and the fourth through-hole being arranged on the first flange and the second and the fifth through-hole being arranged on the second flange.

9. The hydraulic valve according to claim 1, further comprising a first operative flanged member removably connected to the second and the third through-hole or to the fifth and the sixth through-hole.

10. The hydraulic valve according to claim 9, further comprising a second operative flanged member removably connected to the second and the third through-hole or to the fifth and the sixth through-hole.

11. The hydraulic valve according to claim 9, wherein said first member comprises one of the following members: a two- or three-way solenoid pilot electrovalve, a two- or three-way pressure-reducer pilot valve, a quick-relief pilot valve, a two- or three-way pressure-sustaining pilot valve, a manual double- or triple-throw switch, or an hydraulic amplifying relay.

12. The hydraulic valve according to claim 1, wherein the hydraulic valve comprises a sealing edge, said first duct and second duct meeting along the sealing edge, the hydraulic valve being symmetrical with respect to a plane S whereby a symmetry plane S passes through the sealing edge.

13. The hydraulic valve according to claim 1, wherein the flanged and removable connection comprises mated, opposing surfaces.

* * * * *